(12) United States Patent
Kramer

(10) Patent No.: US 9,638,133 B2
(45) Date of Patent: May 2, 2017

(54) CERAMIC MATRIX COMPOSITE LINER ATTACHMENT

(71) Applicant: United Technologies Corporation, Hartford, CT (US)

(72) Inventor: George J. Kramer, Tolland, CT (US)

(73) Assignee: United Technologies Corporation, Farmington, CT (US)

( * ) Notice: Subject to any disclaimer, the term of this patent is extended or adjusted under 35 U.S.C. 154(b) by 1197 days.

(21) Appl. No.: 13/687,178

(22) Filed: Nov. 28, 2012

(65) Prior Publication Data

US 2014/0147266 A1 May 29, 2014

(51) Int. Cl.
*F02K 1/82* (2006.01)

(52) U.S. Cl.
CPC ........... *F02K 1/822* (2013.01); *F05D 2240/90* (2013.01); *F05D 2250/241* (2013.01); *F05D 2260/30* (2013.01); *F05D 2300/6033* (2013.01); *Y02T 50/675* (2013.01)

(58) Field of Classification Search
CPC .............. F02K 1/78; F02K 1/80; F02K 1/82; F02C 7/20; F01D 25/243; F01D 25/28
See application file for complete search history.

(56) References Cited

U.S. PATENT DOCUMENTS

| 960,899 | A | * | 6/1910 | Guyer ................ F16L 27/0849 285/181 |
|---|---|---|---|---|
| 5,957,067 | A | | 9/1999 | Dobbeling et al. |
| 6,904,757 | B2 | | 6/2005 | Mitchell et al. |
| 7,056,053 | B2 | * | 6/2006 | Schilling et al. ............ 403/337 |
| 7,237,389 | B2 | | 7/2007 | Ryan et al. |
| 7,546,743 | B2 | | 6/2009 | Bulman et al. |
| 8,122,727 | B2 | | 2/2012 | Shi et al. |
| 2013/0318979 | A1 | * | 12/2013 | Kramer et al. ................ 60/752 |

* cited by examiner

*Primary Examiner* — Eric Keasel
*Assistant Examiner* — Cameron Corday
(74) *Attorney, Agent, or Firm* — Carlson, Gaskey & Olds, PC

(57) ABSTRACT

An attachment structure and ceramic matrix composite liner combination for a gas turbine engine has a ceramic matrix composite liner including plural flanges extending away from a face of said liner. The flanges have an opening and a bracket secured to the flanges by a securement member extending through the opening in the flange, and through an opening in the bracket. The flanges are secured to the securement member through at least one washer having a spherical face facing a spherical recess in the flanges.

8 Claims, 4 Drawing Sheets

CERAMIC MATRIX COMPOSITE LINER ATTACHMENT

BACKGROUND OF THE INVENTION

This application relates to a way of mounting a ceramic matrix composite liner to a support structure for use in a gas turbine engine.

Gas turbine engines are known, and typically include a compressor compressing air and delivering it into a combustion section where it is mixed with fuel and ignited. Products of this combustion pass downstream over turbine rotors, driving them to rotate. The turbine rotors in turn drive compressor rotors.

Downstream of the turbine rotors the products of combustion leave the engine through an exhaust nozzle. Liners are provided at the exhaust nozzle. The liners are often formed of a ceramic matrix composite material, and it has been difficult to adequately mount these liners in the past. Typically, flat washers have been utilized to secure arms on the liner to a hanger bracket, and with a bolt and pin connection.

However, this connection has sometimes resulted in damage to the ceramic matrix composite liners.

SUMMARY OF THE INVENTION

In a featured embodiment, an attachment structure and ceramic matrix composite liner combination for a gas turbine engine has a ceramic matrix composite liner including plural flanges extending away from a face of the liner. The flanges have an opening and a bracket secured to the flanges by a securement member extending through the opening in the flange, and through an opening in the bracket. The flanges are secured to the securement member through at least one washer having a spherical face facing a spherical recess in the flanges.

In another embodiment according to the previous embodiment, an opening in the spherical washer through which the securement member extends has an inner bore which is more closely spaced from an outer periphery of the securement member than the outer periphery of the securement member is spaced from the opening in the flange.

In another embodiment according to any of the previous embodiments, the securement member is one of a bolt or rivet.

In another embodiment according to any of the previous embodiments, there are spherical washers on both of two sides of the flange.

In another embodiment according to any of the previous embodiments, one of the spherical washers is positioned between an ear on the bracket and spherical recess in the flange, and there being a second spherical recess on the flange on an opposed one of the two sides of the flange.

In another embodiment according to any of the previous embodiments, there are a plurality of brackets, and a plurality of flanges secured to the plurality of brackets.

In another embodiment according to any of the previous embodiments, there are spherical washers on both of two sides of the flange.

In another embodiment according to any of the previous embodiments, one of the spherical washers is positioned between an ear on the bracket and spherical recess in the flange. A second spherical recess is on an opposed one of the two sides of the flange.

In another embodiment according to any of the previous embodiments, there are a plurality of brackets, and a plurality of flanges secured to the plurality of brackets.

In another embodiment according to any of the previous embodiments, the hanger is to be attached to a support structure by a self-locking bolt and nut. A flanged washer is captured between the self-locking bolt and nut, and within an aperture in the hanger bracket. The flanged washer allows adjustment of the mount bracket relative to the support structure when the mount bracket is attached to the support structure.

In another embodiment according to any of the previous embodiments, the liner is in a turbine exhaust nozzle.

In another embodiment according to any of the previous embodiments, the liner is in an augmentor.

In another featured embodiment, a gas turbine engine has a compressor, a combustion section, and a turbine. The compressor and turbine rotate about a central axis and a plurality of ceramic matrix composite liners, which are attached to support structure within the gas turbine engine. The liners include plural flanges extending away from a face of the liner which will face away from a chamber radially inward of the liner. The flanges have an opening, and a bracket secured to the flanges by a securement member extending through the opening in the flanges, and through an opening in the bracket. The flanges are secured to the securement member through at least one washer having a spherical face facing a spherical recess in the flanges.

In another embodiment according to the previous embodiment, an opening in the spherical washer through which the securement member extends has an inner bore which is more closely received with an outer periphery of the member than the outer periphery of the securement member is spaced from the opening in the flange.

In another embodiment according to any of the previous embodiments, the securement member is one of a bolt or rivet.

In another embodiment according to any of the previous embodiments, there are spherical washers on both of two sides of the flange, with one of the spherical washers positioned between an ear on the bracket and flange. There is a second spherical recess on the flange on an opposed one of the two sides of the flange.

In another embodiment according to any of the previous embodiments, there are a plurality of brackets, and a plurality of the flanges secured to the plurality of brackets.

In another embodiment according to any of the previous embodiments, the hanger is be attached to the support structure by a self-locking bolt and nut. A flanged washer is captured between the self-locking bolt and nut, and within an aperture in the support structure, and an aperture in the hanger bracket. The flanged washer allows adjustment of the mount bracket relative to the support structure.

In another embodiment according to any of the previous embodiments, the gas turbine engine includes an exhaust nozzle. The plurality of ceramic matrix composite liners are positioned in the exhaust nozzle.

In another embodiment according to any of the previous embodiments, the gas turbine engine includes an augmentor. The plurality of ceramic matrix composite liners are positioned in the augmentor.

These and other features may be best understood from the following drawings and specification.

DETAILED DESCRIPTION

Figure 1A:
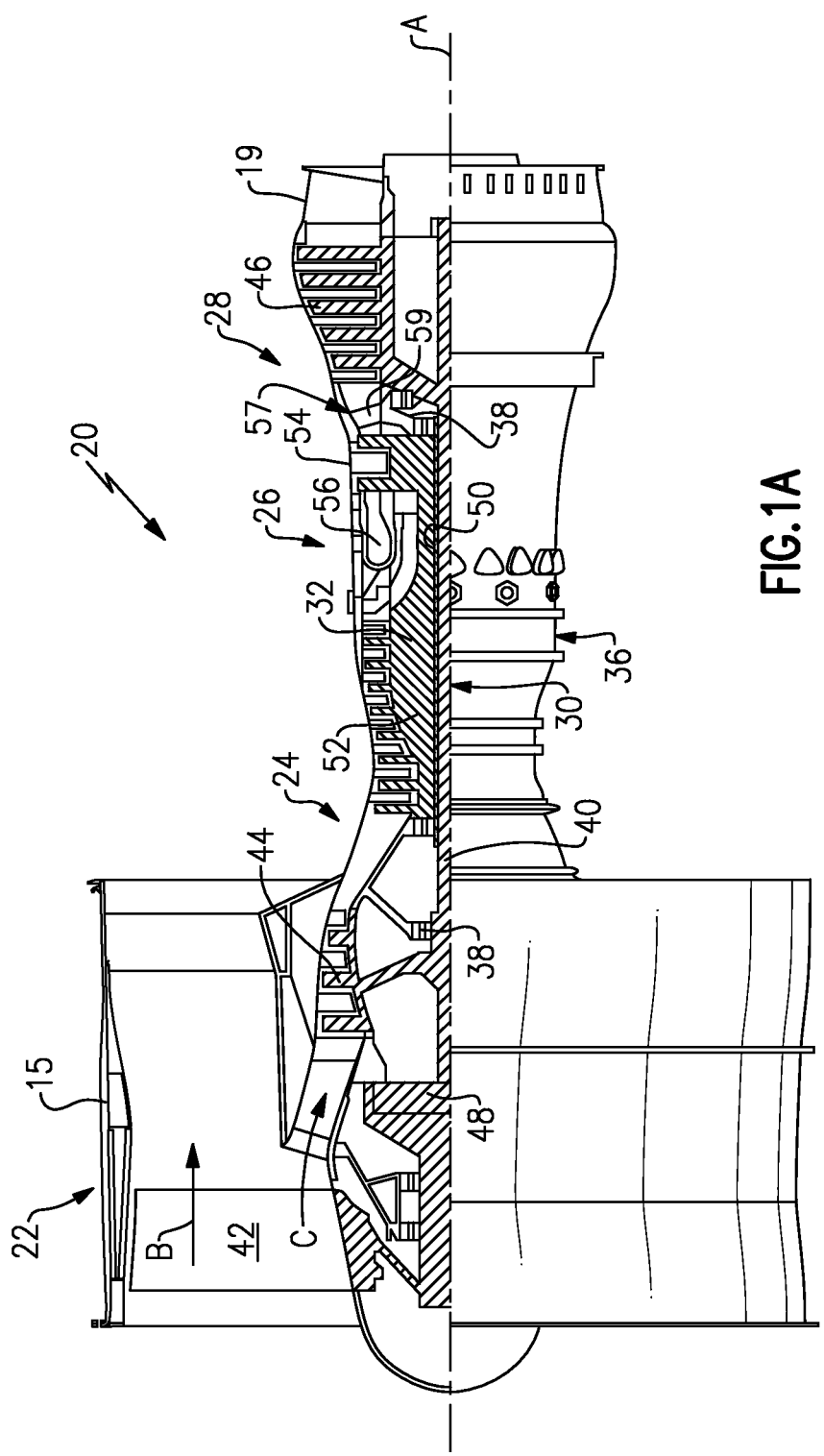
FIG. 1A schematically shows a gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. A turbine exhaust nozzle 19 receives the hot products of combustion downstream of the low pressure turbine 46.

Figure 1B:
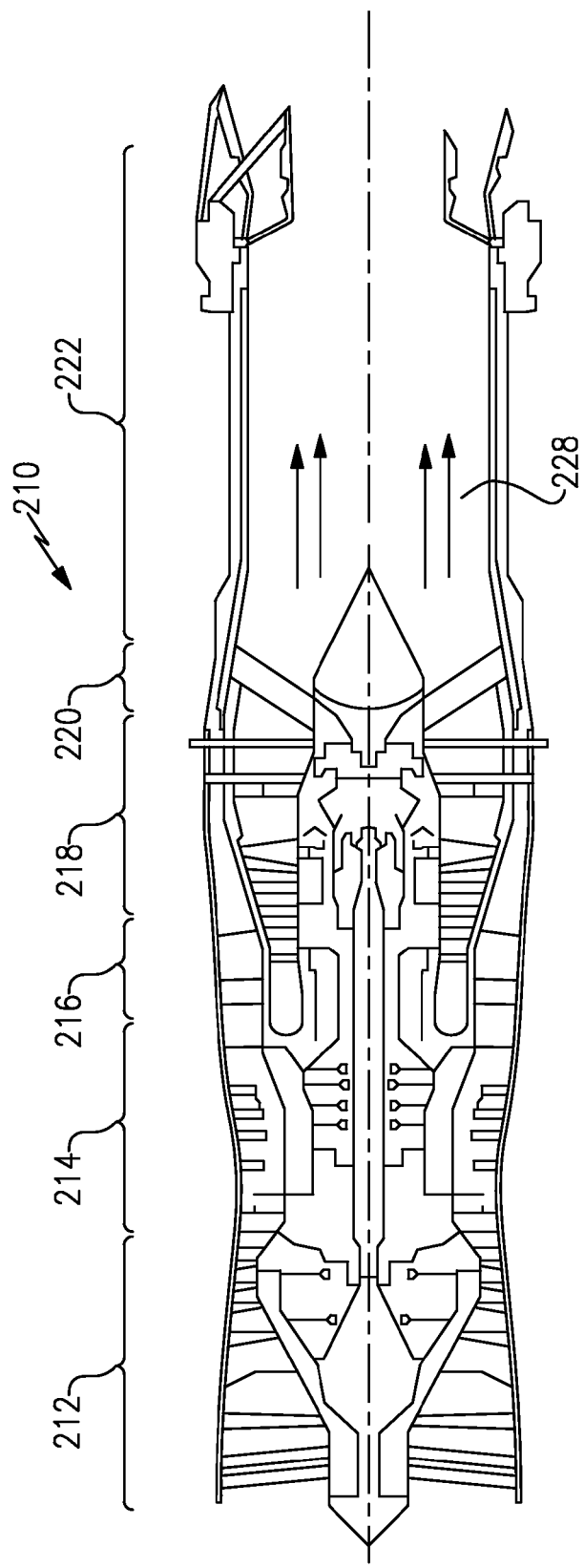
FIG. 1B shows another schematic gas turbine engine.

Referring to FIG. 1B, a gas turbine engine 10 may include a fan section 212, a compressor section 214, a combustor section 216, and a turbine section 218. Air entering into the fan section 212 is initially compressed and fed to the compressor section 214. In the compressor section 214, the incoming air from the fan section 212 is further compressed and communicated to the combustor section 216. In the combustor section 216, the compressed air is mixed with gas and ignited to generate a hot exhaust stream 228. The hot exhaust stream 228 is expanded through the turbine section 218 to drive the fan section 212 and the compressor section 214. In this example, the gas turbine engine 210 includes an augmenter section 220 where additional fuel can be mixed with the exhaust gasses 228 and ignited to generate additional thrust. The exhaust gasses 228 flow from the turbine section 218 and the augmenter section 220 through an exhaust liner assembly 222.

Figure 2:
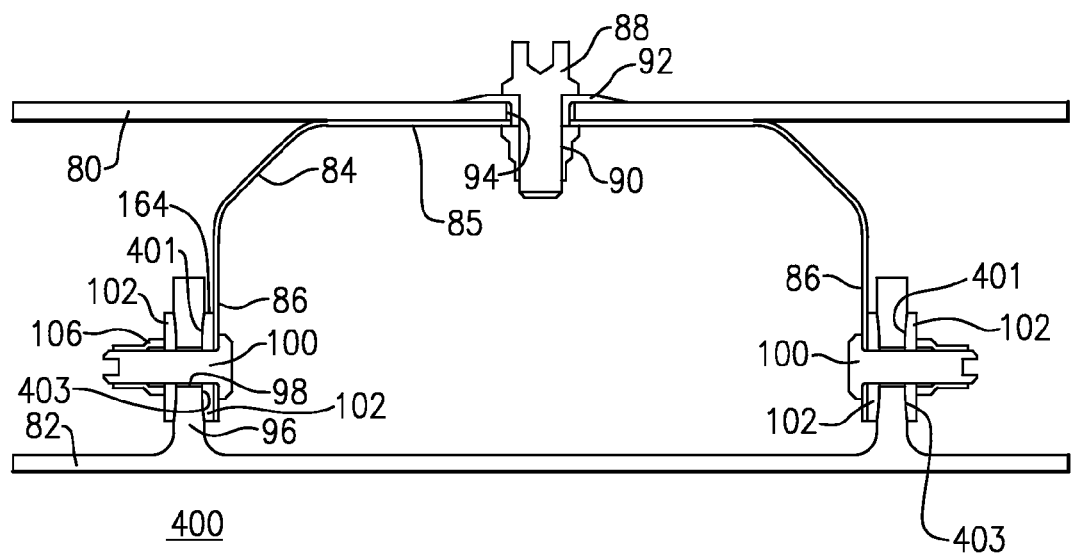
FIG. 2 shows a detail of one mount bracket for mounting a liner to a support structure.

FIG. 2 shows a connection between a ceramic matrix composite liner 82, and support or static structure 80 within the gas turbine engine. As shown, a self-locking bolt 88 and nut 90 capture a flanged washer 92, and the support structure 80 to secure a mount bracket 84. The mount bracket 84 has a central web 85 which is secured by the bolt 88. The mount bracket 84 also has ears 86 extending radially inwardly towards the liner 82. As will be understood, the liner 82 faces hot products of combustions in a chamber 400.

The liner 82 may be utilized in the turbine exit nozzle 19 as shown in FIG. 1A, or as part of the augmentor section 220 in FIG. 1B. The liners 82 may be utilized in other areas having a hot chamber 400, but these two will be common examples.

The liner 82 has flanges 96 extending away from the hot chamber 400, and which are secured to the hanger bracket 84. The flanges 96 extend away from a face of the liner 82 that faces away from the chamber 400, radially inward of the liner 82. As shown, bolts or pin rivets 100 extend through an opening 98 in the flange 96, and a nut or collar 106 secures the bolt or rivet 100. Spherical washers 102 are positioned on each axial side of the flange 96. A clearance is provided between a radially outer portion of the bolt or rivet 100 and an inner portion of the hole 98. Other securement members may be used at 100. There is less of a clearance between an inner bore of the washers 102, such that forces transmitted from the bolt or rivet 100 are transmitted into the washers 102.

Since the washers 102 have a spherical face 401 in contact with a spherical recess 403 in a face of the flange 96, there is greater contact surface area. Thus, there is less stress on any portion of the surface of the flange 96. Since these forces are transmitted over a larger surface area, and since there is less clearance between the washer 102 and the bolt or rivet 100 than there is between the inner surface of opening 98 of the flange 96, the flange 96 is protected compared to the prior art.

Figure 3:
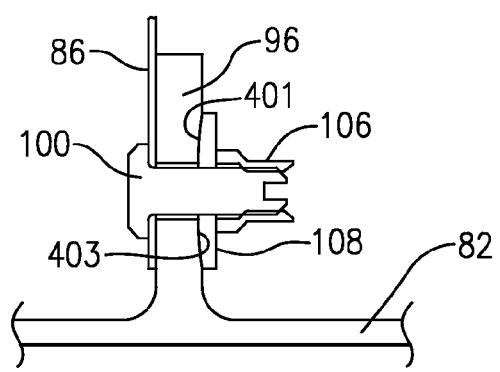
FIG. 3 shows an alternative detail.

FIG. 3 shows an embodiment wherein the hanger ear 86 is not separated from the flange 96 by a washer, but there is a washer 108 on an opposed side. Again, there is a spherical surface 403 on the flange 96, and a spherical face 401 on the washer 106.

Figure 4:
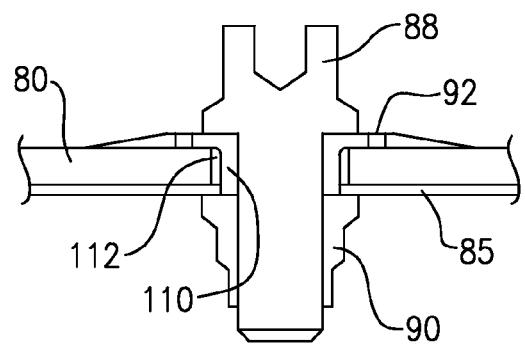
FIG. 4 shows another feature.

FIG. 4 shows the bolt 88 secured with the flanged washer 92, and the nut 90, capturing the static structure 80 and hanger web 85. The use of the flanged washer will allow adjustment for relative thermal growth between the hanger/bracket 84 and the support structure 80.

Figure 5:
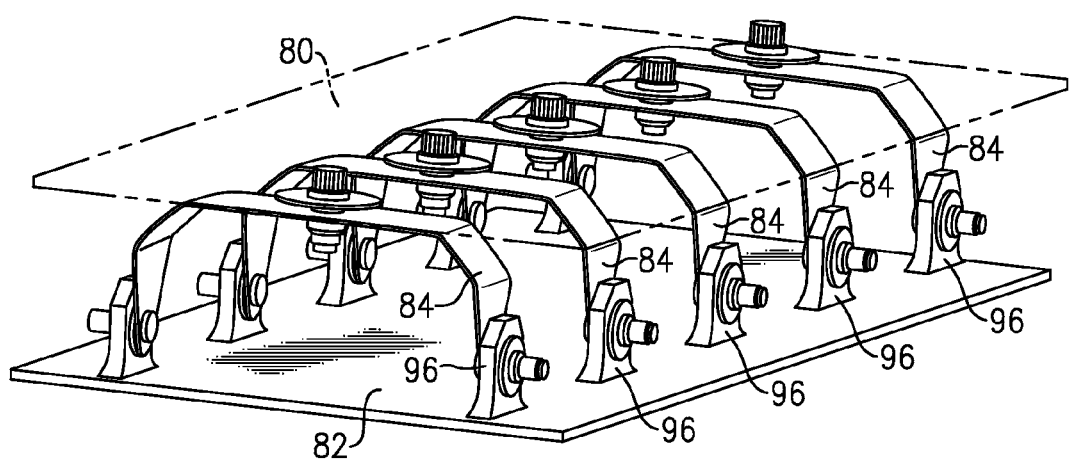
FIG. 5 shows the overall connection.

FIG. 5 shows that there are a plurality of the hanger/bracket 84 connecting the static or support structure 80 to the ceramic matrix composite liner 82.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. An attachment structure and ceramic matrix composite liner combination for a gas turbine engine comprising:

a ceramic matrix composite liner including plural flanges extending away from a face of said liner;

said flanges having an opening, and a bracket secured to said flanges by a securement member extending through said opening in said flange, and through an opening in said bracket, and said flanges being secured to said securement member through at least one washer having a spherical face facing a spherical recess formed in said flanges;

wherein there are spherical washers on both of two sides of said flange; and wherein one of said spherical washers is positioned between an ear on said bracket and said spherical recess in said flange, and there being a second spherical recess on said flange on an opposed one of said two sides of said flange.

2. A gas turbine engine comprising:

a compressor, a combustion section, a turbine, said compressor and said turbine for rotating about a central axis and a plurality of ceramic matrix composite liners, said ceramic matrix composite liners being attached to a support structure within the gas turbine engine; and said liners including plural flanges extending away from a face of said liner which faces away from a chamber radially inward of said liner;

said flanges having an opening, and a bracket secured to said flanges by a securement member extending through said opening in said flanges, and through an opening in said bracket, and said flanges being secured to said securement member through at least one washer having a spherical face facing a spherical recess formed in said flanges, said flanges formed of ceramic matrix composite material; and said spherical washers being on each of two sides of each said flange, with one of said spherical washers positioned between an ear on said bracket and said spherical recess in said flange, and there being a second spherical recess on each said flange on an opposed one of said two sides of said flange.

3. The gas turbine engine as set forth in claim 2, wherein an opening in said spherical washers through which said securement member extends has an inner bore which is more closely received with an outer periphery of said member than said outer periphery of said securement member is spaced from said opening in said flanges.

4. The gas turbine engine as set forth in claim 2, wherein said securement member is one of a bolt or rivet.

5. The gas turbine engine as set forth in claim 2, wherein there are a plurality of said brackets, and a plurality of said flanges secured to said plurality of said brackets.

6. The gas turbine engine as set forth in claim 2, wherein said hanger is be attached to said support structure by a self-locking bolt and nut, and a flanged washer being captured between said self-locking bolt and nut, and within an aperture in the support structure, and an aperture in the hanger bracket, and said flanged washer allowing adjustment of the mount bracket relative to the support structure.

7. The gas turbine engine as set forth in claim 2, wherein said gas turbine engine includes an exhaust nozzle, and said plurality of said ceramic matrix composite liners are positioned in said exhaust nozzle.

8. The gas turbine engine as set forth in claim 2, wherein the gas turbine engine includes an augmentor, and said plurality of said ceramic matrix composite liners are positioned in said augmentor.

* * * * *